May 2, 1950     C. H. WHITE     2,505,872

METHOD OF MAKING PLANTER RUNNERS

Filed Oct. 19, 1946     3 Sheets-Sheet 1

INVENTOR
CHARLES H. WHITE
BY
ATTORNEYS

May 2, 1950  C. H. WHITE  2,505,872
METHOD OF MAKING PLANTER RUNNERS
Filed Oct. 19, 1946  3 Sheets-Sheet 2
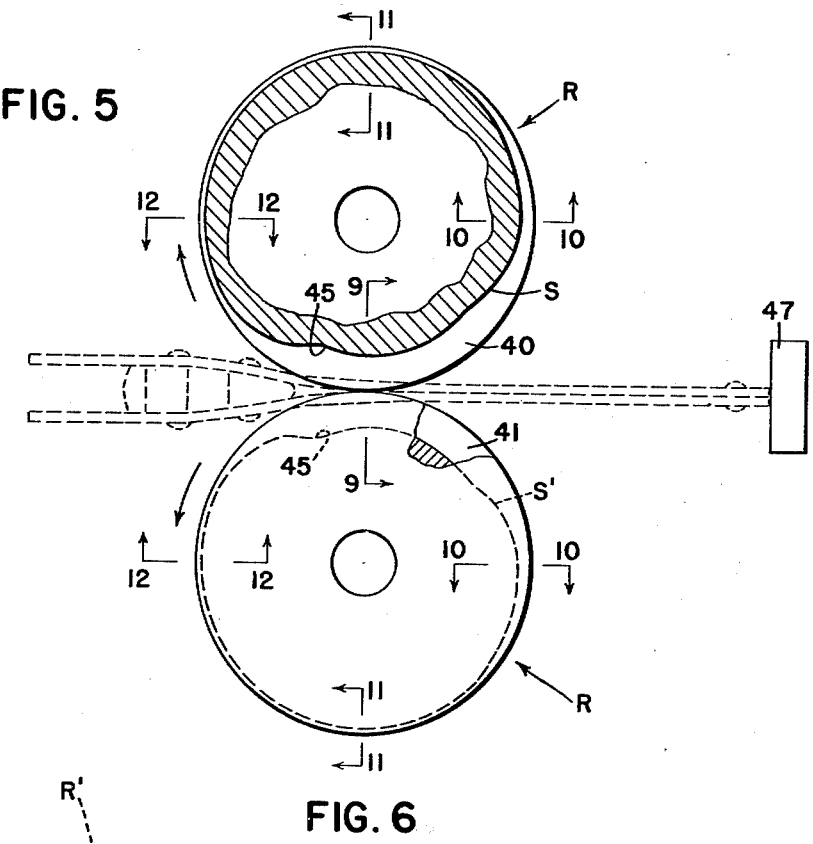
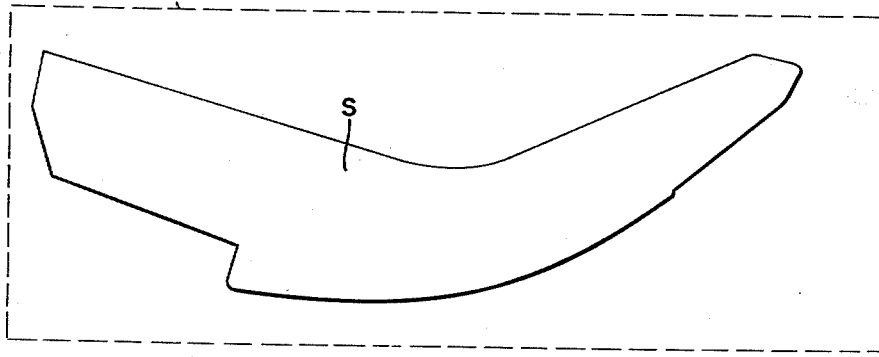
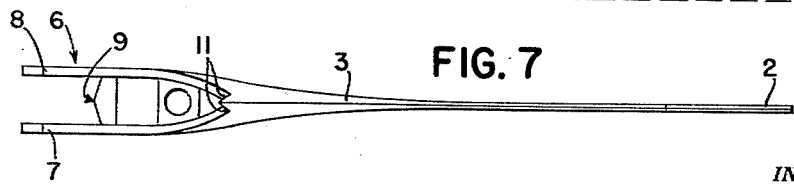
INVENTOR
CHARLES H. WHITE
BY
ATTORNEYS May 2, 1950   C. H. WHITE   2,505,872
METHOD OF MAKING PLANTER RUNNERS
Filed Oct. 19, 1946   3 Sheets-Sheet 3

INVENTOR
CHARLES H. WHITE
BY
ATTORNEYS

Patented May 2, 1950

2,505,872

UNITED STATES PATENT OFFICE 2,505,872

METHOD OF MAKING PLANTER RUNNERS

Charles H. White, Moline, Ill., assignor to Deere & Company, Moline, Ill., a corporation of Illinois Application October 19, 1946, Serial No. 704,310

2 Claims. (Cl. 29—148.3)

The present invention relates generally to agricultural implements and more particularly to planters and the like having curved runner type furrow openers.

The object and general nature of the present invention is the provision of a new and improved method for making runner type furrow openers for planters and the like. More specifically, it is a feature of this invention to provide a new method of making planter runner furrow openers by a forge rolling process in which the plate blanks are heated to welding temperatures and then shaped by being passed through forging rolls having the developed shape of the completed furrow opener sunk in their surfaces. In this way, not only may the generally rectangular blanks be given the desired upward curvature characteristic of the runner type furrow opener but, additionally, the lower or convex edge may be made as thin as desired to facilitate passage of the furrow opener through the ground. Particularly, it is a feature of this invention to form the planter runner furrow opener of a pair of substantially identical generally rectangular plates having their inner or contacting faces polished so that they may be brought into such intimate contact during the forging operation that the two plates are welded or integrally united into one piece without the use of welding flux or the like and at the same time have the desired shape imparted thereto.

These and other objects and advantages will be apparent to those skilled in the art after a consideration of the following detailed description, taken in conjunction with the accompanying drawing in which one preferred manner of carrying out the principles of this invention have been illustrated.

In the drawings:

Figure 5 is a diagrammatic representation of the rolls of a forge rolling machine, the surfaces of the forging rolls having substantially closed die cavities sunk into their contacting surfaces so as to act together to form the developed shape of the completed furrow opener.

Figure 6 is a plan view of the developed shape of the completed planter runner furrow opener, corresponding to a development of the forging die cavity formed in each of the two associated forging rolls.

Figure 7 is a lower edge view of a forged runner blank assembly, before final trimming.

Figures 9–12, inclusive, are fragmentary sections taken through the engaging portions of the forging rolls as these portions progressively come into engagement during the rotation of the rolls, such sections corresponding to sections taken generally along the lines 9—9, 10—10, 11—11, and 12—12 of Figure 5.

Figure 8:
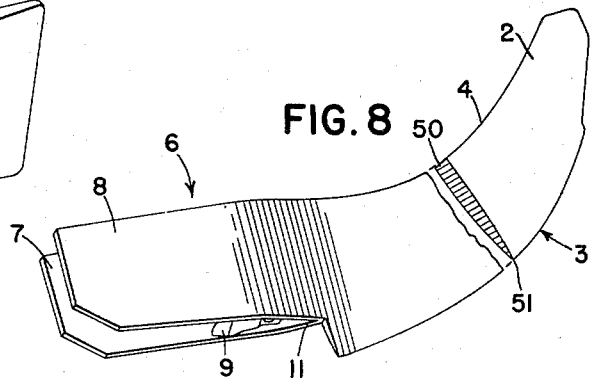
Figure 8 is a perspective view of a completed furrow opener.

Referring now to the drawings, particularly Figure 8, which is a perspective of a completed runner, it will be seen that the same comprises an upwardly curved cutting section disposed at the front, indicated by the reference numeral 2 and having a convex edge 3 that is made narrow or sharpened, sometimes referred to as "plating," and an upper edge 4 which is thicker than the lower edge 3 for purposes of adding to the strength of the runner furrow opener. The rear section 6 of the runner furrow opener is bifurcated, affording two wing-like portions 7 and 8 which are spaced apart to receive therebetween a seed boot block 9 to which the lower end of the seed boot of the planter shank is connected, as by a bolt or the like. Each of the wing sections 7 and 8 is laterally offset, beginning at point 11, so that the wings 7 and 8 may function to keep clods and the like from rolling down onto the seed in the furrow row.

Figure 1:
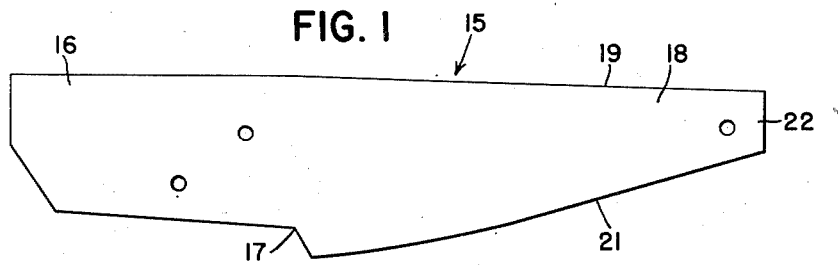
Figure 1 shows one of the blanks of the pair of substantially identical blanks from which the furrow opener, constructed according to the present invention, is made.

Referring now to the method of manufacturing the planter runner furrow opener shown in Figure 8, Figure 1 is a plan of one of the blanks utilized, according to the present invention, in a novel method wherein forging rolls are used for rolling the runner plates into final shape. From Figure 1 it will be seen that the blank comprises a generally rectangular elongated plate 15 having a rear end 16 notched, as at 17, and having a front section 18 the upper edge 19 of which extends at a slight angle to the line of the upper edge of the rear section 16 and the lower edge 21 of which extends in a slightly convex curve upwardly and forwardly, terminating in a relatively short end 22. Two of such blanks or plates 15 are required to make one complete runner.

Figure 2:
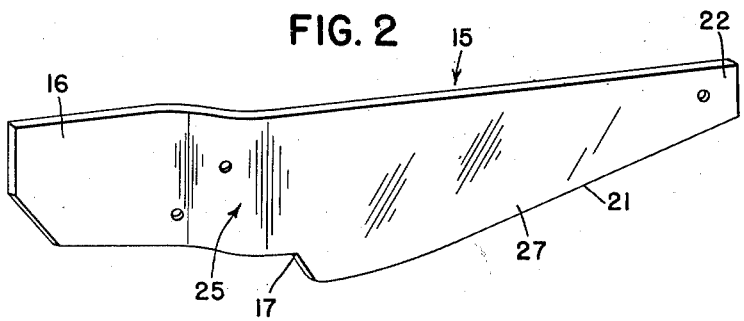
Figure 2 shows one of the blanks after it has been bent and polished on the inner surface of the forward portion thereof.
Figure 3:
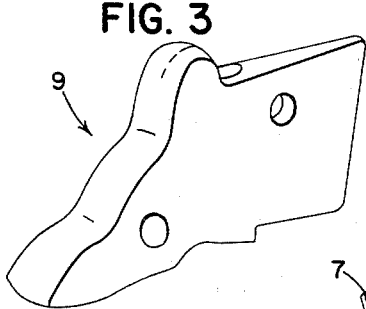
Figure 3 is a perspective view of the seed boot block that is adapted to be disposed between the rear laterally offset portions of the blanks or plates.
Figure 4:
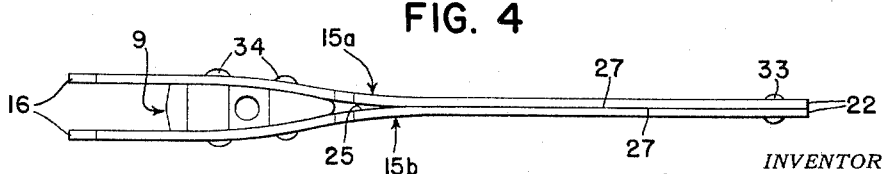
Figure 4 is a perspective view showing the two bent plates riveted together with the inner polished surfaces of the plates thus held together in intimate contact.
Figure 9:
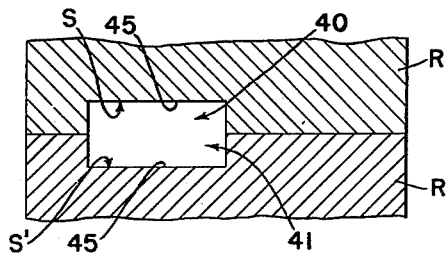

After the blanks 15 have been cut out, as indicated in Figure 1, the next step is to bend the rear portions of the blanks so as to form pairs of right and left hand blanks with the rear portion of one bent outwardly in one direction and the rear portion of the other bent outwardly in the other direction, as shown in Figures 2 and 4. In these figures the zone of the bend is indicated by the reference numeral 25, and in Figure 4 the right hand bent blank is indicated by the reference numeral 15a while the left hand blank is indicated at 15b. The inner surface 27 of each blank is polished so that when the right and left hand blanks are assembled together, as shown in Figure 4, the polished surfaces 27 are disposed in intimate contact. Preferably, the polished surface extends from the zone of bend 25 forwardly to the forward end 22 of each blank. After the blanks 15a and 15b have been polished they are brought together as mentioned above with a runner block or support 9 disposed between the rear laterally offset sections, indicated at 16, rearwardly of the bent portions 25 of the blanks. Next the two blanks are riveted together, as by a rivet 33 at the front end and a pair of rivets 34 at the rear portion which also pass through the seed boot block or support 9. In this way the two blanks and associated parts are rigidly held together.

Figure 10:
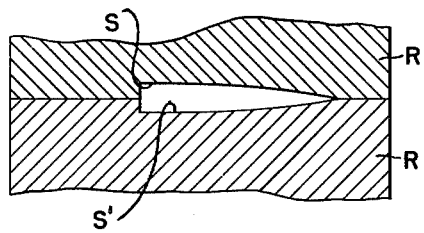
Figure 11:
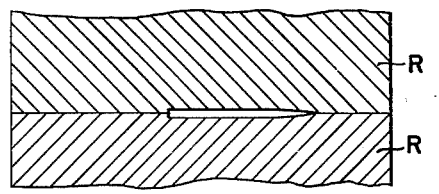
Figure 12:
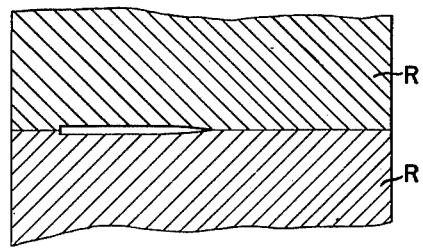

Next the assembled blanks, as shown in Figure 4, are heated in a suitable furnace and brought to welding temperature, around 2200° F. Then the assembled and heated blanks are passed through the rolls R (Figure 5) of a forging machine. The rolls R are formed with the developed shape of the finished runner furrow opener cut in their surfaces. The upper roll R has a surface S in which one half of the developed shape of the completed runner furrow opener is formed as a die recess 40. A similar and complementary die depression 41 is sunk in the surface $S^1$ of the lower roll R. The surfaces S and $S^1$ are in firm contact with one another except for the die cavities 40 and 41. The rolls R are accurately geared together and operated by suitable power, the rolls rotating in the direction of the arrows shown in Figure 5. Also, the rolls are formed so that at registering points in each roll the die cavities 40 and 41, are deepened, as indicated at 45 in Figure 5. This provides adequate clearance to permit the insertion of the assembled blanks (Figure 4) into the rolls, in which the blank unit is brought upward into a position in which the front ends 22 of the blanks engage a stop 47. Then as the rolls R continue their rotation the more shallow portions of the die cavities 40 and 41 progressively engage the heated metal, pressing the same together and causing the metal to flow uniformly throughout the die cavities, the heat and pressure being sufficient to be brought to the shape shown in Figure 6, which is a diagrammatic representation of the developed shape of the completed runner furrow opener. Also, the heat and pressure is sufficient to cause the two polished surfaces 27 to fuse one into the other and to be welded together into one integral part. As best shown in Figures 10–12, the opposing die surfaces S are much closer together at one side than the other. Therefore, after the assembled blanks have been inserted into the large die cavities 40 and 41 and up to the stop 47, and the rolls R rotated in the directions of the arrows in Figure 5, the portions of the die surfaces S that are closer together will exert a greater pressure on the blanks at one side than the other, thus causing the one side to become thinner and extended and resulting in the desired forward and upward curvature of the runner, as indicated in Figures 6 and 8; that is, the upper edge of the forward portion of the runner is thickened, as at 50, while the lower edge is beveled or plated, as indicated at 51, forming the soil entering or soil cutting edge 3 mentioned above. The two die cavities 40 and 41 form, in effect, a closed die so that the metal of the two blanks is caused to flow accurately while in a plastic state and to fill the die cavities completely, this being facilitated by the provision of the stop 47 and by care exercised in cutting the blanks to the desired size and dimension. If desired, of course, either or both of the rolls R may be provided with a narrow flash relief if necessary, preferably at the end 22 (of the blanks).

While I have shown and described above the preferred structure and the preferred way of carrying out the principles of the present invention, it is to be understood that my invention is not to be limited to the particular details shown and described above, but that, in fact, widely different means may be employed in the broader aspects of my invention.

What I claim, therefore, and desire to secure by Letters Patent is:

1. The method of making a planter runner which comprises providing a pair of similar plates, each plate having a forward section and a laterally offset rear section, the upper edge of said forward section extending offset from the corresponding edge of the rear section, the opposite edge of the forward section being inclined forwardly towards said upper edge, the two edges terminating in a short end, securing the two plates together at spaced points so as to hold the plates fixed in assembled relation with the adjacent faces of the forward sections substantially in contact, heating the forward sections of said plates to a welding temperature, and progressively simultaneously welding and shaping by rolling said forward sections beginning at the juncture with the rear sections, the rolling pressure on the side including the aforesaid inclined edge being greater and of a character to form a sharpened edge and also to increase the length of said side whereby the aforesaid forward section is bent to form an upwardly curved cutting portion.

2. The method of making a planter runner which comprises providing a pair of similar plates, each plate having a forward section and a rear section, the lower edge of the forward section being inclined forwardly toward the upper edge thereof, the two edges terminating in a short end, securing the two plates together at spaced points so as to hold the plates fixed in assembled relation with the adjacent faces of the forward sections substantially in contact, heating the forward sections of said plates to a welding temperature, and progressively simultaneously welding and shaping by rolling said forward sections beginning at the juncture with the rear sections, the rolling pressure on the side including the aforesaid inclined edge being greater and of a character to form a sharpened edge and also to increase the length of said side whereby the aforesaid forward section is bent to form an upwardly curved cutting portion.

CHARLES H. WHITE.

(References on following page)

REFERENCES CITED

The following references are of record in the file of this patent:

UNITED STATES PATENTS

| Number | Name | Date |
|---|---|---|
| 155,088 | Howe | Sept. 15, 1874 |
| 158,657 | Watson | Jan. 12, 1875 |
| 164,621 | Watson | June 15, 1875 |
| 499,061 | Van Brunt | June 6, 1893 |
| 621,852 | Rowland | Mar. 6, 1899 |
| 639,665 | Commichau | Dec. 19, 1899 |
| 726,026 | Canda | Apr. 21, 1903 |
| 1,158,294 | Robinson | Oct. 26, 1915 |
| 1,543,880 | Sheehan | June 30, 1925 |
| 1,673,477 | Yates | June 12, 1928 |
| 1,710,262 | Kellogg | Apr. 23, 1929 |
| 2,190,429 | Kellogg | Feb. 13, 1940 |
| 2,327,706 | Halstead | Aug. 24, 1943 |
| 2,334,923 | Hand | Nov. 23, 1943 |
| 2,438,759 | Liebowitz | Mar. 30, 1948 |